United States Patent
Summers et al.

(10) Patent No.: US 10,152,194 B2
(45) Date of Patent: Dec. 11, 2018

(54) TRANSMITTING HARDWARE-RENDERED GRAPHICAL DATA

(71) Applicant: Citrix Systems, Inc., Fort Lauderdale, FL (US)

(72) Inventors: Jacob J. Summers, Coral Springs, FL (US); Chakravarthi Valicherla, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 462 days.

(21) Appl. No.: 14/491,013

(22) Filed: Sep. 19, 2014

(65) Prior Publication Data

US 2015/0082178 A1    Mar. 19, 2015

Related U.S. Application Data

(60) Provisional application No. 61/879,764, filed on Sep. 19, 2013.

(51) Int. Cl.
*G06F 3/0481* (2013.01)
*H04L 29/08* (2006.01)
(Continued)

(52) U.S. Cl.
CPC .............. *G06F 3/0481* (2013.01); *G06F 3/14* (2013.01); *G09G 5/363* (2013.01); *H04L 67/10* (2013.01);
(Continued)

(58) Field of Classification Search
None
See application file for complete search history.

(56) References Cited

U.S. PATENT DOCUMENTS 5,853,367 A * 12/1998 Chalek .................. G06F 9/5055
128/916
7,283,468 B1    10/2007 Hill et al.
(Continued)

FOREIGN PATENT DOCUMENTS

CN        101931622 A    12/2010
CN        102741811 A    10/2012

OTHER PUBLICATIONS

"Technical White Paper: Unleash the Client—HP t310 Zero Client couples balzing performance with advanced secruity features and easy management," Mar. 2013, pulled from <http://www8.hp.com/us/en/pdf/t310-whitepaper_tcm_245_1389301.pdf>, 8 pages.
(Continued)

*Primary Examiner* — Tize Ma
(74) *Attorney, Agent, or Firm* — Banner & Witcoff, Ltd.

(57) ABSTRACT

Methods and systems are disclosed for transmitting data from a host computing device to a client computing device. This data may include graphical data, which may require additional processing by a renderer, such as a graphical processing unit (GPU), prior to being transmitted. Upon being forwarded to a specialized hardware component that, for example, may combine a GPU with a controller and one or more network interfaces, the graphical data may be rendered, packetized and transmitted without being provided to a system memory of the host computing device or otherwise involving the host computing device. Data packets including rendered graphical data may be generated by a second processor, different from the host processor of the host computing device.

20 Claims, 8 Drawing Sheets

(51) Int. Cl.
  *G06F 3/14* (2006.01)
  *G09G 5/36* (2006.01)
(52) U.S. Cl.
  CPC ... *G09G 2360/08* (2013.01); *G09G 2370/022* (2013.01); *G09G 2370/025* (2013.01)

(56) References Cited

U.S. PATENT DOCUMENTS

| | | | |
|---|---|---|---|
| 7,830,388 B1 | 11/2010 | Lu | |
| 9,215,259 B2* | 12/2015 | Emerson, III | H04L 67/10 |
| 2003/0223494 A1* | 12/2003 | Kurauchi | H04N 7/16 |
| | | | 375/240.08 |
| 2010/0141678 A1* | 6/2010 | Abdo | G06F 3/14 |
| | | | 345/619 |
| 2010/0189131 A1* | 7/2010 | Branam | H04N 21/23424 |
| | | | 370/474 |
| 2011/0196972 A1* | 8/2011 | Farmer | H04L 12/1822 |
| | | | 709/228 |
| 2011/0210962 A1 | 9/2011 | Horan et al. | |
| 2011/0310105 A1* | 12/2011 | Koneru | G06F 3/14 |
| | | | 345/501 |
| 2013/0204927 A1* | 8/2013 | Kruglikov | G06F 9/54 |
| | | | 709/203 |
| 2013/0290478 A1* | 10/2013 | Diard | G06F 3/1454 |
| | | | 709/217 |
| 2014/0173674 A1* | 6/2014 | Wolman | H04N 21/25 |
| | | | 725/116 |
| 2016/0210722 A1* | 7/2016 | Fortin | G06T 15/005 |

OTHER PUBLICATIONS

"Increase 3D Design Productivity and Efficiency with the Teradici PCoIP® Remote Workstation Soluciton and AMD FirePro™ R5000 REmote Graphics," Jan. 2014, pulled from <http://www.amd.com/Documents/Teradici_AMD_solution_brief.pdf>, 2 pages.

"Performance Study: Virtualized Graphics with Teradici PcoIP Hardware Accelerator," Mar. 2014, pulled from <http://10zig.com/media/virtualized_graphics_with_hardware_accelerator_pcoip.pdf>, 11 pages.

* cited by examiner

TRANSMITTING HARDWARE-RENDERED GRAPHICAL DATA

FIELD

The present disclosure relates to user interfaces for hosted applications. The present disclosure also relates to methods and systems to integrate remotely hosted applications into the desktop environment of a local computing device. Additionally, the present disclosure relates to methods and systems for transmitting data that is generated on a host computing device to a client computing device

BACKGROUND

Remote applications and/or remote desktops are widely utilized for both consumer and enterprise applications. Consumers often prefer remote applications or desktops because they offer a secure and simple alternative to local customized installations, which may prove technically demanding or vulnerable to malicious software. Enterprise administrators often opt for remote applications or desktops over local installations due to their scalability, security, and platform-agnostic accessibility.

Data from remote applications and/or remote desktops may require graphical data to be transmitted from a remote host device to a client device. For example, a remote host may render graphical data that is ultimately displayed on a display device. This graphical data may need be processed, rendered, or otherwise derived at the remote host device before transmission to the client device. For example, a remote host may include a graphical processing unit (GPU) device, which is configured to render graphical data into an image of a desktop or application. However, GPUs are conventionally designed and manufactured for direct output to a locally attached display device, such as a monitor. GPUs are not conventionally designed to send graphical data over a network connection for output via a client device, as is the case in a remote access environment. Accordingly, the processing, rendering and packetizing of graphical data for transmission to a client device from a host device may require the host device to perform numerous storage and retrieval operations to/from the host device's system memory. Performing such operations can be a time- and computation-intensive task, resulting in system inefficiency.

BRIEF SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to transmitting graphical data more rapidly and efficiently from a rendering device, such as a GPU. Stated differently, there exists a need for an efficient way for a remote host to transmit GPU data to a client device for use by the client device when rendering remotely accessed services such as applications and desktops. Aspects described herein address this and other deficiencies in the prior art.

A first aspect described herein provides a method for delivering graphical data from a host device to a client device. A first processor of a host device having a system memory may determine a portion of data to transmit to the client device. When it has been subsequently determined that the portion of data is graphical data, the graphical data may be delivered for rendering such as, for example, by a hardware renderer. One or more graphical data packets based on rendered graphical data may then be generated by a second processor, without providing the rendered graphical data or graphical data packets to a system memory or otherwise involving the system memory. The graphical data packets may then be sent to the client device, again without providing the rendered graphical data or graphical data packets to system memory or otherwise involving the system memory.

A second aspect described herein provides an apparatus having a graphical processing unit, network interface, processor, and memory. The processor may receive a portion of data and determine whether the portion of data is graphical data. If so, the processor may deliver the graphical data to the graphical processing unit for processing. Subsequent to processing, one or more graphical packets may then be generated based on the graphical data without providing the graphical data or graphical packets to a system memory or otherwise involving the system memory. The graphical packets may then be transmitted to a remote device using the network interface.

Some aspects described herein provide a method of sending graphical data packets such as by inserting one or more graphical data packets into a stream of packets between two non-graphical data packets. Other aspects provide a method of sending the graphical data packets such as by opening a first and second connection between devices. The first connection may be configured for transmitting non-graphical data, and the second connection may be configured for transmitting graphical data. The graphical data may be transmitted using the second connection. Other aspects provide for intercepting one or more placeholder graphical data packets already present in a stream of packets and replacing the one or more placeholder graphical data packets with one or more generated graphical data packets.

DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein provide the transmission of graphical data more rapidly and efficiently from a graphical renderer of a host computing device to a client device by, in some aspects, determining whether a portion of data to be transmitted to a client device is either graphical or non-graphical data. If the data is graphical data, the data is delivered to the graphical renderer. A controller, having a processor different from the general processor of the host computing device, generates one or more graphical data packets based on the rendered data. The generated graphical data packets are then sent to the client device.

After the one or more graphical data packets have been generated, the controller may prepare the one or more graphical data packets for transmission to the client device. In some aspects, this preparation may occur by injecting the graphical packets into a stream of data to be transmitted from the host computing device. In some aspects, this preparation may include intercepting placeholder packets in a stream of data and replacing the placeholder packets with the generated packets. In some aspects, the preparation may include preparing the graphical packets for transmission over a connection configured for graphical data separate from a connection configured for non-graphical data.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
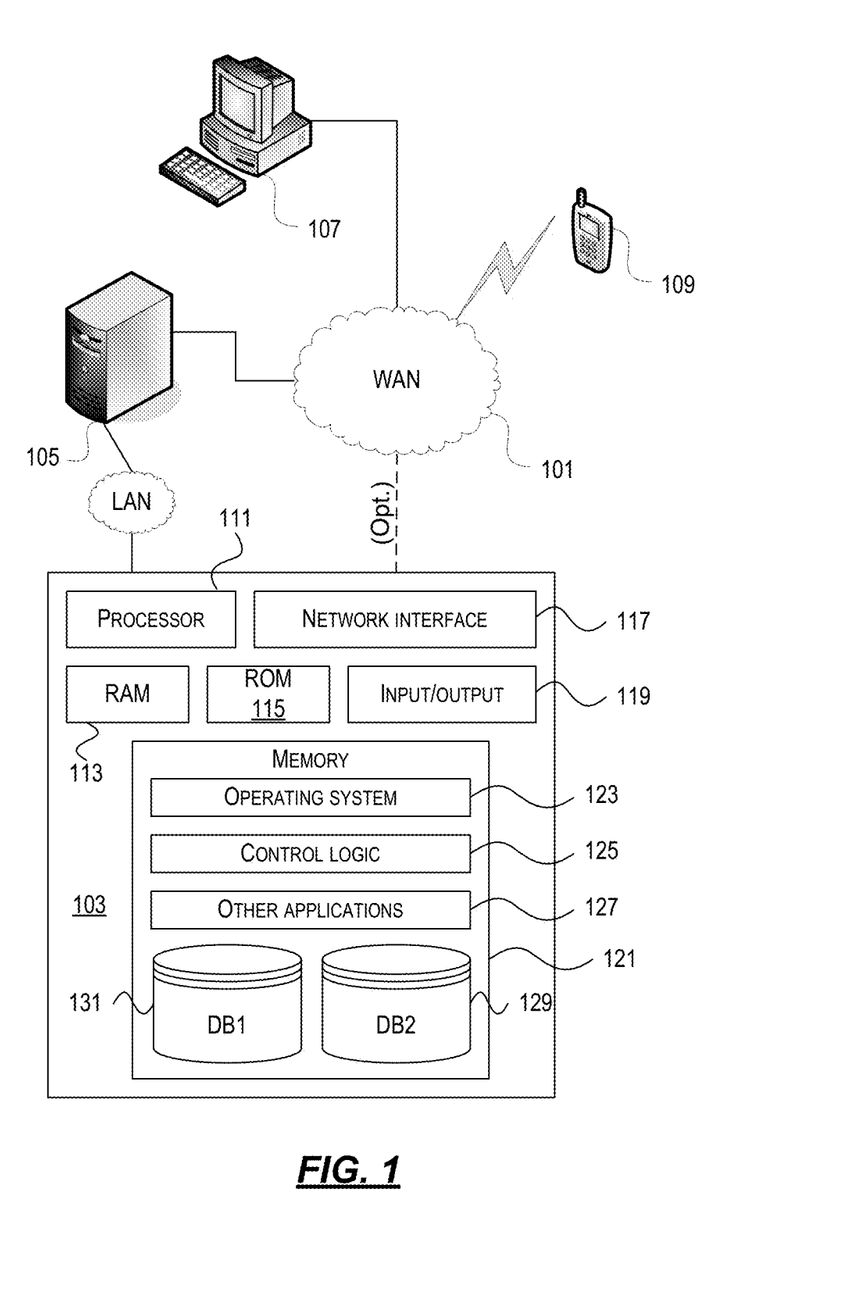
FIG. 1 depicts an illustrative computer system architecture that may be used in accordance with one or more aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the invention in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the invention as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. The network interfaces may be coupled directly or through industry standard Peripheral Component Interconnect Express (PCIe) connectors, Universal Serial Bus (USB) connectors, or other suitable type of connector.

I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the invention, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionality may be embodied in whole or in part in software, firmware and/or hardware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
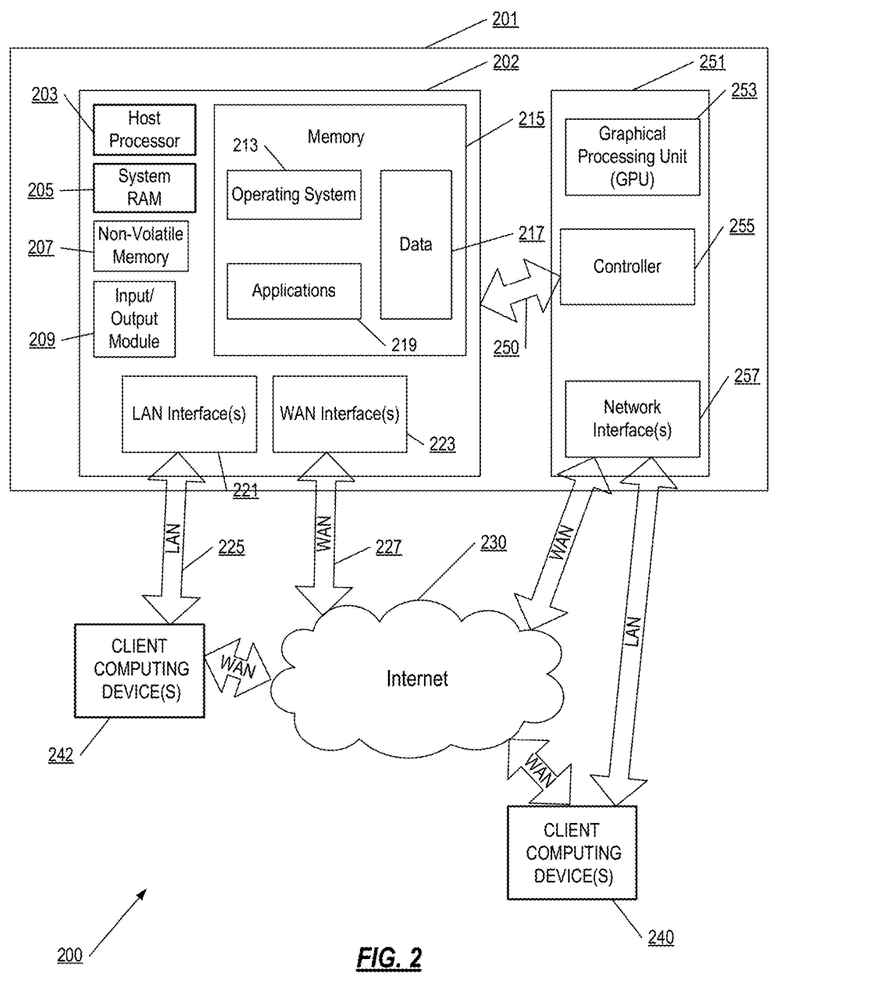
FIG. 2 depicts an illustrative remote-access system architecture that may be used in accordance with one or more aspects described herein.

FIG. 2 illustrates a block diagram of a computing environment 200 according to one or more embodiments of the disclosure. The computing environment 200 comprises a host computing device 201 (e.g., any computing device incorporating the use of at least one processor and at least one memory) and host hardware subcomponent 251. The host computing device 201 may correspond to the components 103, 105, 107, or 109 shown in connection with FIG. 1. According to one or more aspects, host computing device 201 may be a server in a single-server or multi-server desktop virtualization system (e.g., a cloud system) configured to provide virtual machines for client access devices. The host computing device 201 may have a general processor 203 for controlling overall operation of the server and its associated components, including random access memory (RAM) 205, non-volatile memory 207, input/output (I/O) module 209, and memory 215.

I/O module 209 may include a mouse, keypad, touch screen, scanner, optical reader, and/or stylus (or other input device(s)) through which a user of host computing device 201 may provide input, and may also include one or more of a speaker for providing audio output and a video display device for providing textual, audiovisual, and/or graphical output. Software may be stored within memory 215 and/or other storage to provide instructions to general processor 203 for enabling host computing device 201 and/or host hardware subcomponent 251 to perform various functions. For example, memory 215 may store software used by the host computing device 201, such as an operating system 213, application programs 219, and an associated database 217. Alternatively, some or all of the computer executable instructions for host computing device 201 may be embodied in firmware stored in the non-volatile memory 207. The non-volatile memory 207 may comprise read only memory (ROM), electrically erasable ROM, or flash memory, for example.

The host computing device 201 may implement any or all of the data processing devices shown in connection with FIG. 1, and may be communicatively coupled via one or more telecommunication connections to one or more computing client devices 240, 242. Each of the one or more client computing devices 240, 242 may comprise a thin client. A thin client may rely on the host computing device 201, alone or in combination with host hardware subcomponent 251, to generate and deliver various applications. One or more of the client computing devices 240 may be accessed via the WAN while the other one or more client computing devices 242 may be accessed through a LAN. The client computing devices 240, 242, may comprise a desktop computer, a laptop, mobile communication device, or any digital appliance that comprises at least one processor and at least one memory. The one or more client computing devices 240, 242 may include many or all of the elements described above with respect to the host computing device 201, including the elements of host hardware subcomponent 251 discussed in detail below. The network connections depicted in FIG. 2 include a local area network (LAN) 225 and a wide area network (WAN) 227, but may also include other networks (now shown). The host computing device 201 may be connected to the LAN 225 through a network interface or adapter 221. The host computing device 201 may include a modem 223 or other WAN network interface for establishing communications over the WAN 227, by way of the Internet 230. It will be appreciated that the network connections shown are illustrative and other means of establishing a communications link between the host computing device 201 and the one or more client computing devices 240, 242 may be used. Host computing device 201 and/or the one or more client computing devices 240, 242 may also comprise any type of portable wireless computing devices (e.g., mobile phones, smartphones, PDAs, notebooks, and the like). Each of the one or more client computing devices 240, 242 may be the same as the computing devices 107 and 109 described in connection with FIG. 1.

The host computing device 201, in some embodiments, may execute a remote presentation client or other client or program that uses a thin-client or remote-display protocol to capture display output generated by an application executing on the host computing device 201 and transmits the application display output to the one or more remote client computing devices 240, 242. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The host computing device 201, in some embodiments, may be any server type. In other embodiments, the host computing device 201 may be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. Some embodiments include a host computing device 301 that receives requests from a client computing device 240, forwards the request to a server (not shown), and responds to the request generated by the client device 240 with a response from the second server. The host computing device 201 can acquire an enumeration of applications available to one of the client devices 240 and well as address information associated with an application server (not shown). The host computing device 201 can then present a response to the client's request using a web interface, for example, and communicate directly with one or more of the client computing devices 240 to provide the one or more client computing devices 240 with access to an identified application.

The client computing devices 240 may, in some embodiments, be a client node that seeks access to resources provided by the host computing device 201. In other embodiments, the host computing device 201 may provide client computing devices 240 or client nodes with access to hosted resources. In addition to the host computing device 201, one or more servers (not shown), in some embodiments, may function as a master node such that the master node communicates with one or more of the client computing devices 240. In some embodiments, the master node can identify and provide address information associated with a server (of the one or more servers) that hosts a requested application, to one or more of the client computing devices 240. Yet, in other embodiments, the master node can be a server farm, at the one or more client computing devices 240, a cluster of client nodes, or an appliance.

The host computing device 201 may transmit data over the Internet 230 to the client devices 240, 242 as shown in FIG. 2. The WAN 229 and/or LAN 225 may comprise one or more sub-networks, and can be implemented using any combination of the client computing devices 240, host computing device 301, digital appliances (not shown), and network devices (not shown) included within the computing environment 200. The Internet 230 may be implemented using any combination of the following network types: ATM (Asynchronous Transfer Mode); SONET (Synchronous Optical Network); SDH (Synchronous Digital Hierarchy); wireless; and/or wireline. The network topology of the WAN 229 and LAN 225 may differ within different embodiments, and possible network topologies include but are not limited to: a bus network topology; a star network topology; a ring network topology; a repeater-based network topology; or a tiered-star network topology. Additional embodiments may include mobile telephone networks that use a protocol to communicate among mobile devices, where the protocol may include, but is not limited to: AMPS; TDMA; CDMA; GSM; GPRS; UMTS; LTE; WiMAX; EDGE, or any other protocol capable of transmitting data among mobile devices.

As mentioned above, computing environment 200 includes host hardware component 251, which comprises graphical processing unit (GPU) 253, controller 255, and may comprise one or more network interface(s) 257 for transmitting data over networks similar to WAN 227 and LAN 225 discussed above. Host primary computing device 202 and host hardware component 251 are operatively connected together via link 250, which may be, but is not limited to, any physical linkage such as a system bus. Additionally or alternatively, link 250 may be any network linkage similar to any of those discussed above, including (as examples only) WAN 227 and LAN 225. The subcomponents of hardware component 257 may be physically coupled on or in a single device, such as a single physical card or physical component, such as a PCI (peripheral component interconnect) card. Alternatively, GPU 253, controller 255, and network interface(s) 257 may be physically located on separate cards, components, or subcomponents of computing environment 200, including as part of host primary computing device 202. For example, GPU 253, controller 255, and network interfaces 257 may be physically located in some embodiments on different physical cards or components and operatively coupled using a common bus or interconnect wires coupling the various inputs and outputs of the various subcomponents. GPU 253 and controller 255 may be connected via Digital Video Interfaces (DVI) or one or more High Definition Multimedia Interfaces (HDMI) connectors and/or cables, or other suitable connector. As another example, network interfaces 257, LAN interfaces 221, and WAN interfaces 223 may all be the same interface, which is operatively connected to both host primary computing device 202 and host hardware component 251.

Figure 3:
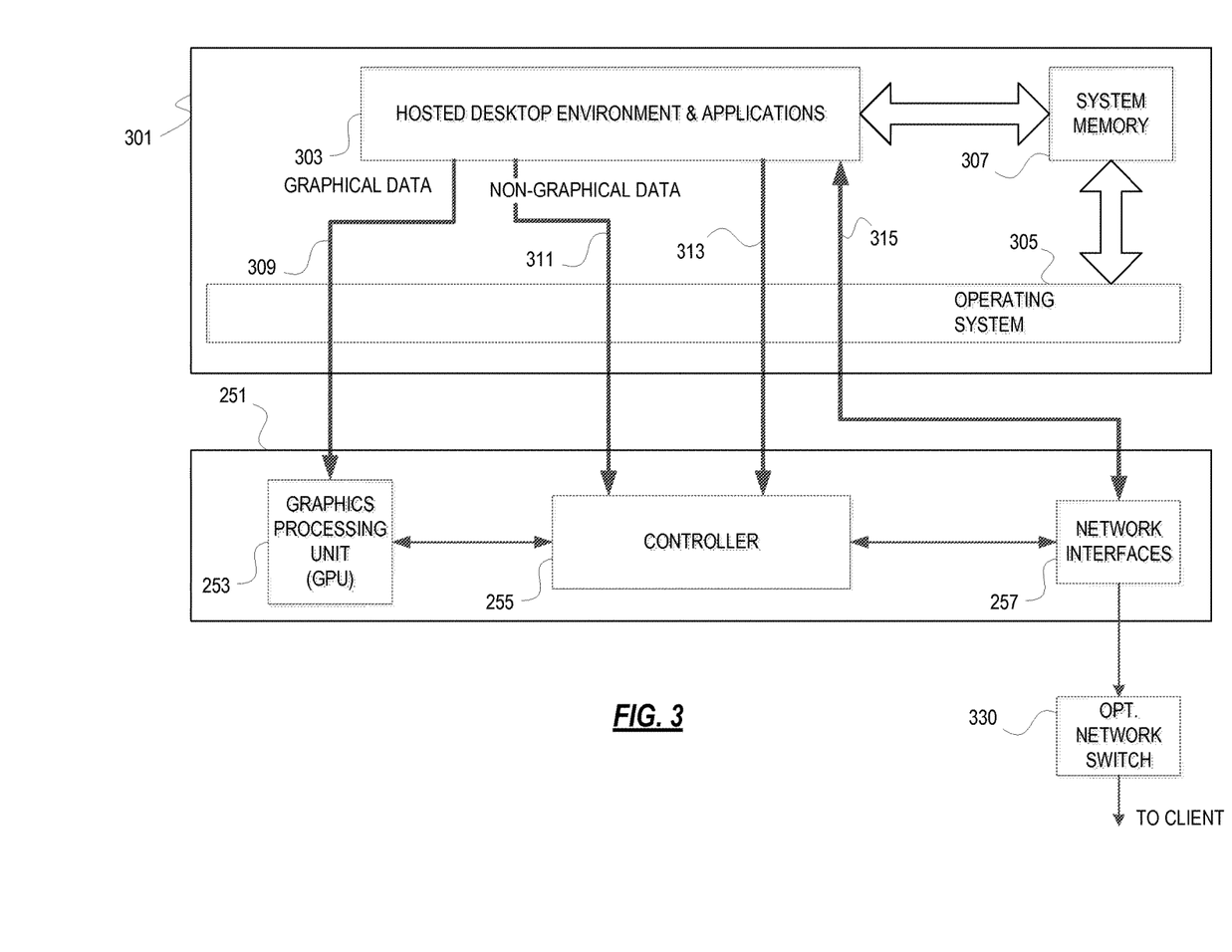
FIG. 3 depicts an illustrative computer system block diagram that may be used in accordance with one or more aspects described herein.

FIG. 3 illustrates a block diagram of software and hardware components of a host computing device, and data flows among and between the various resources of the host computing device. In some embodiments, software component 301 may comprise a hosted desktop environment and applications 303 and operating system 305. A hosted desktop environment 303 may be a server-based or a remote-based application executed by host computing device 201 on behalf of a user of a client device 240. In some embodiments, host computing device 201 may display output data to the client computing device using any thin-client or remote-display protocol, such as the Independent Computing Architecture (ICA) protocol manufactured by Citrix Systems, Inc. of Ft. Lauderdale, Fla., or the Remote Desktop Protocol (RDP) manufactured by Microsoft Corporation of Redmond, Wash.

Hosted desktop environment 303 may comprise a user session containing a remote presentation layer protocol stack. In some embodiments, processes and processors controlling hosted desktop environment 303 may operate or execute software instructions and or data to communicate with an agent service (not shown) executing on client device 240. Additionally, processes and processors controlling hosted desktop environment 303 may operate or execute software instructions to transmit and receive other data and instructions from host system memory 307. Host system memory 307 may include the random access memory (RAM) 205 or non-volatile memory 207 discussed above with respect to FIG. 2.

Operating system software 305 may implement the features of operating system 123, discussed above with respect to FIG. 1, for controlling overall operating of the data processing device. Operating system software 305 may, additionally or alternatively, include control logic, data, and instructions for enabling the transmission and reception between hosted desktop environment and applications 303 and client device 240. Processes or processors executing this control logic, data, and instructions may additionally operate or execute software instructions and or data to transmit and receive other data and instructions from host system memory 307.

Hosted desktop environment and applications 303 may transmit data and instructions to the resources and components of hardware subcomponent 251. In some embodiments, graphical data and non-graphical data may be transmitted from the hosted desktop environment and applications 303 to graphical processing unit 253 and controller 255, respectively, via links 309 and 311. In other embodiments, graphical and non-graphical data alike may be transmitted to controller 255 using a single link such as, for example, link 313. In some embodiments, data link 315 may also be established between hosted desktop environment and applications 303 and network interfaces 257, so that data may be transmitted to the client without usage of the resources of controller 255. FIG. 3 illustrates that data links 309, 311, 313, and 315 as utilizing software and firmware resources of operating system 305, such as hardware drivers. However, in some embodiments, data links 309, 311, 313, and 315 may be implemented without reliance on such operating system resources. Some embodiments may include optional network switch 330, a physical or logical device configurable for processing and routing data. This optional network switch may include multiple ports for the network interfaces discussed above, including the LAN interfaces 221, WAN interfaces 223, and network interfaces 257

The above components allow for graphical data to be transmitted over a network without first providing the graphical data (or the data transmitted over the network) to a system memory in communication with a general or host processor or otherwise involving a system memory. A system memory may be for example, a system RAM (e.g., system RAM 205), a non-volatile memory (e.g., non-volatile memory 207), or other memory that may be directly usable by the general or host processor (e.g., host processor 203). Indeed, as illustrated by the data flows of FIG. 3, graphical data, which may be subject to further processing such as rendering and processing for transmission, may be transmitted over a network to one or more client devices directly from the combined GPU/controller/network interfaces of hardware component 251.

Figure 4A:
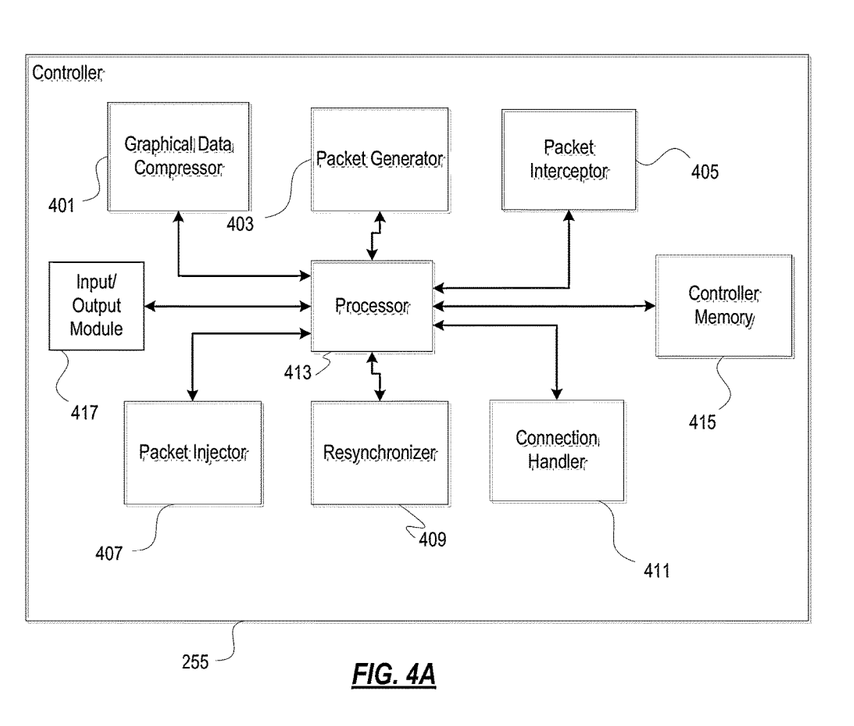
FIG. 4A depicts an example controller system architecture that may be used in accordance with one or more aspects described herein.

FIG. 4A illustrates an example controller system architecture. In particular, the illustrative architecture provides additional details as to one or more embodiments of controller 255. Any portion of controller 255 may be implemented in hardware, software, firmware, a combination thereof, or the like. For example, controller 255 may be implemented as a system-on-chip (SOC), an application-specific integrated circuit (ASIC), a field-programmable gate array (FPGA), or any combination of processors and memory. Examples, for example, of various hardware circuit blocks that comprise controller 255 may include a graphical data compressor 401, packet generator 403, packet interceptor 405, packet injector 407, packet resynchronizer 409, connection handler 411, and/or processor 413. Controller 255 may comprise controller memory 415, which is configurable for storing instructions and/or data for execution by processor 413. Controller 255 may also comprise input and output resources 417 which are configurable to receive any data, including both graphical and non-graphical data, from any one or more of the components of the host primary computing device 202. Additionally, controller 255 may be connected via input and output module 417 to GPU 253, and network interface(s) 257, if present.

Figure 4B:
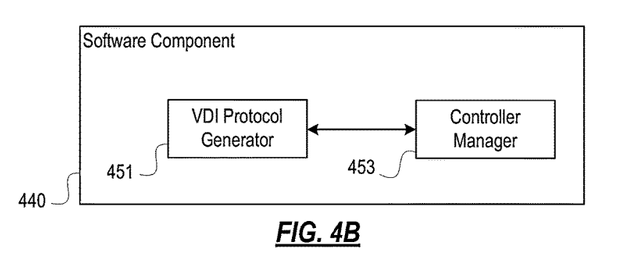
FIG. 4B depicts an example software component that may be used in accordance with one or more aspects described herein.

With further reference to FIG. 4B, which illustrates an example architecture of a software component 440 to facilitate communication of data to and from host primary computing device 202 and host hardware component 251. In some variations, software component may be implemented as one of the applications 219 and, in some instances, may be executed by the host processor 203. Software component 440 may be configured facilitate communication of data from the host computing device 201 and to the client devices 240, 242. Additionally and alternatively, software component 440 may be stored in controller memory 315. The software component may be configured with a controller manager 453 and a VDI (virtual desktop infrastructure) protocol generator 451. VDI protocol generator 451 and controller manager 453 may, in some embodiments, be part of a single application. The general processor 203 may execute data stored in the host memory 215 to invoke the controller manager 453 and the VDI protocol generator 451.

The VDI protocol generator 451 may be configured to generate data and/or instructions regarding a VDI protocol. The VDI protocol comprises a presentation layer protocol such as ICA (independent computing architecture), e.g., available from Citrix Systems, Inc., of Ft. Lauderdale, Fla., and/or any other VDI protocol.

Controller manager 453 may be configured to generate data and/or instructions to facilitate communication between the various resources of host computing device 201 and the various resources of controller 255.

Figure 5:
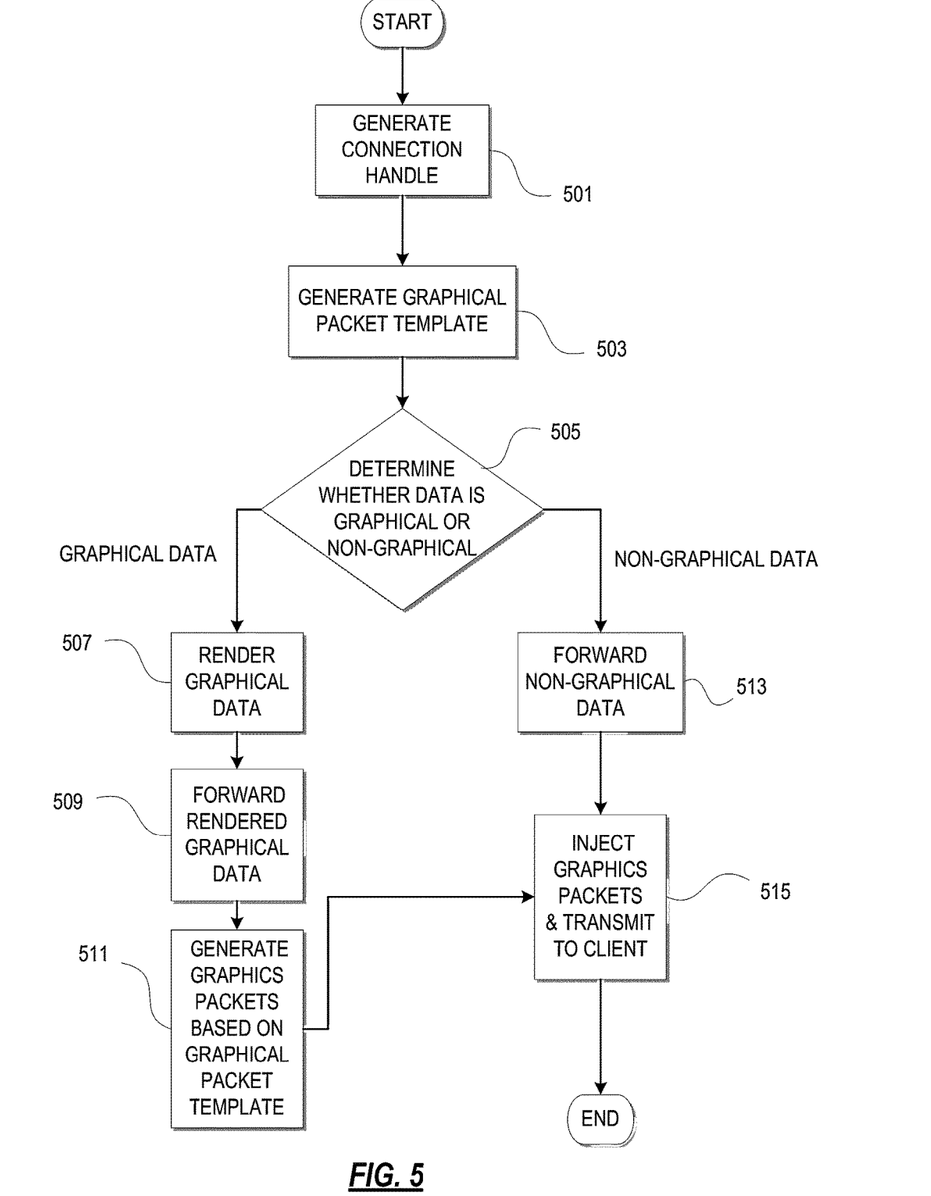
FIG. 5 depicts an illustrative method of transmitting graphical data by injecting graphical data packets into a data stream, in accordance with one or more aspects described herein.
Figure 6:
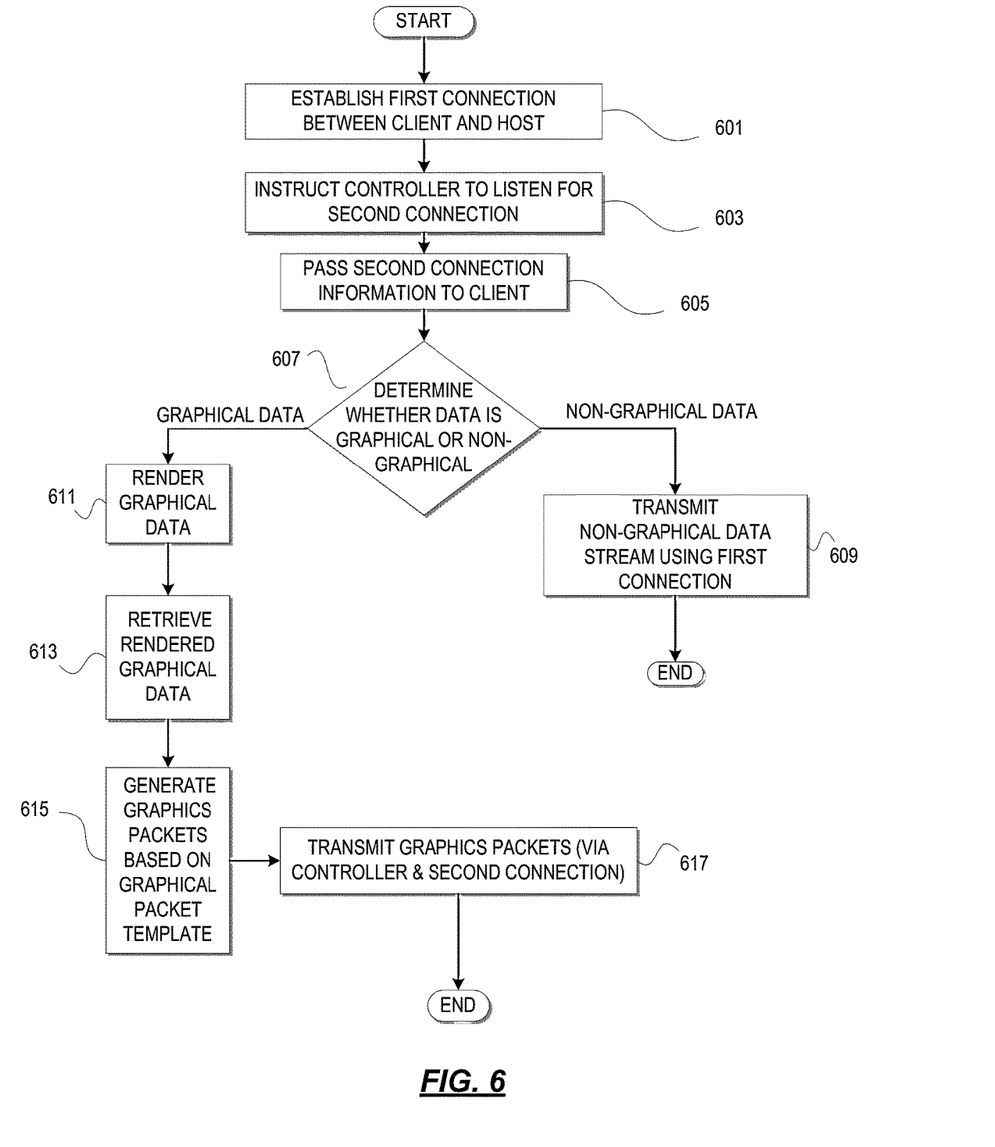
FIG. 6 depicts an illustrative method of transmitting graphical data via second connection opened between a host computing device and a client computing device, in accordance with one or more aspects described herein.
Figure 7:
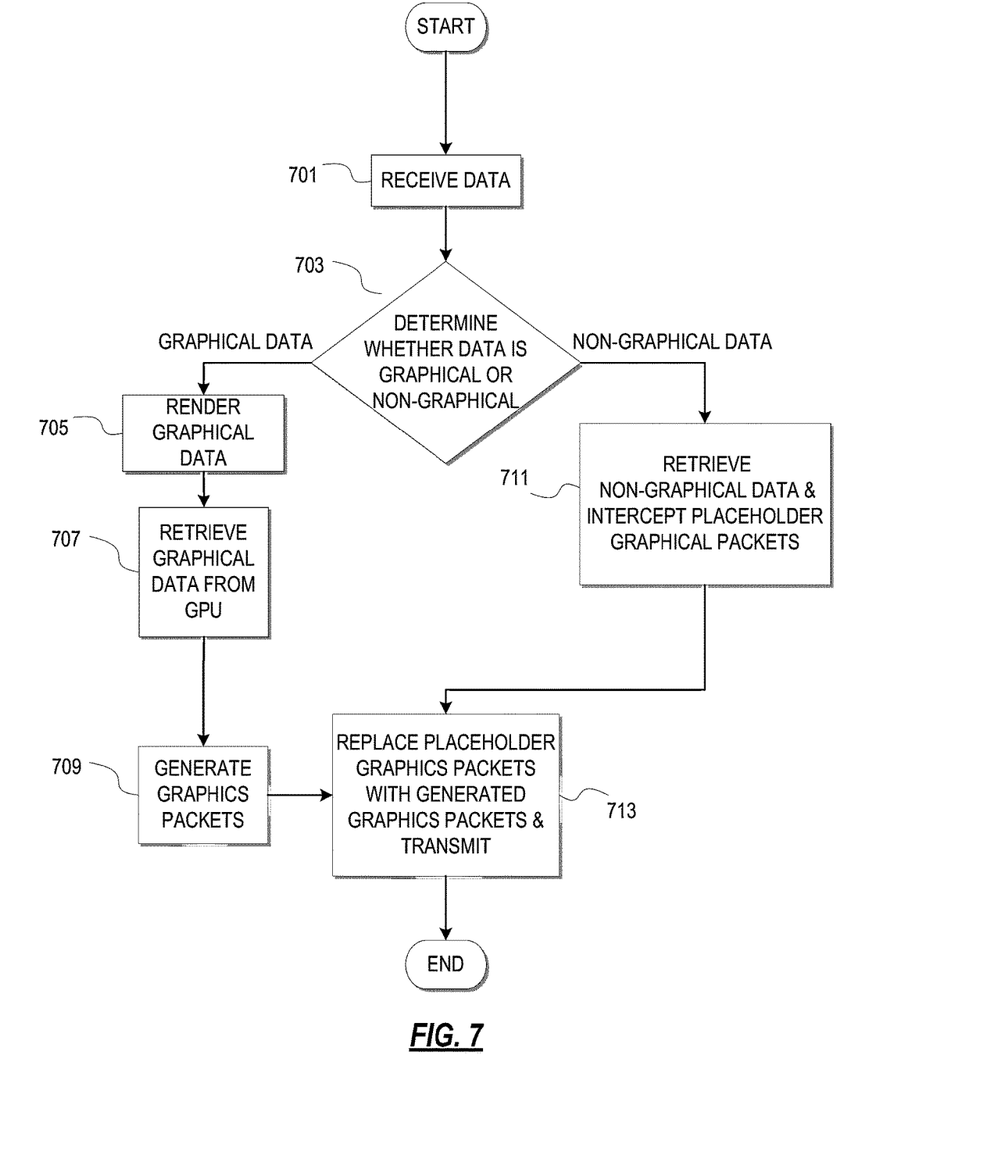
FIG. 7 depicts an illustrative method of transmitting graphical data by intercepting placeholder packets in a data stream and replacing them with graphical data packets, in accordance with one or more aspects described herein.

FIGS. 5-7 present illustrative methods of transferring hardware-rendered graphical data from the host computing device 201 to client device 240. These illustrative methods may be implemented on a system or systems that implement the various hardware and software components or other resources depicted in FIGS. 1-4. As noted above, this hardware-rendered graphical data may incorporate display output that is generated by an application executing on the host computing device 201 for a client device. As such, the hardware-rendered graphical data may include graphical data requiring transmission to the client computing devices 240.

With reference to FIG. 5, which illustrates a method of transmitting graphical data from the host computing device 201 to client device 240 by injecting the graphical data into a data stream, at step 501, a connection handle may be generated.

A connection handle may include information about one or more connections between the host computing device 201 and the client devices 240, using the various networks and subnetworks described above. The connection handle may further include information regarding the remote presentation protocol used to send data between the host computing device 201 and the client devices 240 and 242.

In some embodiments, the connection handle may be generated by one or more software applications and/or hardware modules of host primary computing device 202, including by operating system 213 and controller manager 453. Some embodiments may pass the connection handle from controller manager 453 to controller 255, and the resources thereof, via a special hardware-addressed message. In other embodiments, the connection handle may be generated in software and/or hardware by controller 255, including by the connection handler module 411.

At step 503, a graphical packet template may be generated (also referred interchangeably herein as a template). A graphical packet template may include information describing the formation and structure of packets to transmit data, such as graphical data, between the host computing device 201 and one or more client devices (e.g., client machine 240). The template may include information describing the remote presentation protocol used to communicate data between the host computing devices and the client device 240 and 242. Additionally, the graphical packet template may include information describing how component 255 should form graphical packets.

The template may be written in any machine-readable language, including without limitation, markup languages such as the Extensible Markup Language (XML) and/or a data serialization formats such as JavaScript Object Notation (JSON) or YAML Ain't Markup Language (YAML). In some embodiments, the graphical packet template may be generated by one or more software applications and/or hardware modules of host primary computing device 202, including by controller manager 353 residing in application memory 219 alone, or in coordination or combination with operating system 213. In some embodiments, the graphical packet template may be generated in software and/or hardware by controller 255, including by packet generator module 411.

In some embodiments, steps 501 and 503 may be considered initial steps that occur when a connection is established between host computing device 201 and client computing device 240. Additionally and alternatively, in some embodiments, the template may be generated infrequently (e.g., according to a periodic schedule or at specified times coded into the software component) and stored among the various resources of host computing device 201. The template, in some variations, can be used for multiple host-client communication sessions. As such, the order of steps 501 and 503 may be reversible; that is, the template may be generated before a connection handle is generated.

Prior to step 505, it may be determined that a certain portion of data is to be communicated from the host computing device 201 to the client device 240. This may be because previously communicated data is, for example, out of date and a refresh of the data is required. Additionally or alternatively, the portion of data is to be communicated because of, or in response to, some action taken by or at the host computing device 201 or the client device 240. For example, it may be determined that a frame buffer may require updating. In some embodiments, the frame buffer may include an image of a desktop environment and/or of an application running in a desktop environment.

At step 505, it may be determined whether the portion of data to be communicated is graphical data or non-graphical data. In some variations, graphical data may be data that requires additional processing, rendering, and/or deriving at a renderer, such as GPU 253. Non-graphical data may be data that can be communicated without significant additional processing or rendering. In some embodiments, controller manager 453 or some other software resource of software component 440 may perform the determination of step 505.

For example, the portion of data to be communicated may include PCI data and the determination of step 505 may be performed by a driver of software component 440 (e.g., a Citrix PCI bus driver, a mux/demux driver, or a filter driver). The driver may perform the determination and tag the data to be communicated based on a source of the data (e.g., graphical data may be from a GPU adapter driver, non-graphical data may be from an Ethernet driver). After tagging, the data to be communicated may be multiplexed across a channel (e.g., a PCIe channel) for processing according to whether the data is graphical or non-graphical data. Processing may include placing the data into one of two processing queues (e.g., one for graphical data and one for non-graphical data) in accordance with the tag, and dispatching data from the respective queues when ready for further processing (e.g., data from the graphical data queue may be dispatched to GPU for processing as described beginning at step 507, data from the non-graphical queue may be dispatched to the controller 255 for processing as described beginning at step 513).

In other embodiments, graphical and non-graphical data alike may be passed from primary computing device 202 to the controller 255 or other resource of hardware component 253. Subsequently, the controller 255 (or other resource of hardware component 253) may perform the determination through operation of its hardware and/or software resources. Upon a determination that the data portion is graphical data, the graphical data is communicated or passed, for example, from controller 255 and to the GPU 253 for rendering and processing.

At step 507, the GPU may render the graphical data. GPU 253, as discussed above, can be a graphical processing unit capable of performing various calculations and instructions to render data the GPU receives into graphical display output (also referred interchangeably herein as rendered graphical data). In some embodiments, rendering and processing by GPU 253 may include compressing the data by one or more processors of the GPU. GPU 253 may also convert graphical commands into frame buffer data.

Once the GPU 253 has completed these calculations, the rendered and processed graphical data may be communicated or otherwise forwarded to the controller 255, as illustrated at step 509. In some embodiments, this delivery from GPU 253 to controller 255 can be performed on a scheduled basis. In other embodiments, the delivery can result from the GPU 253 notifying the controller 255 that graphical data has been rendered and currently resides in the memory of the GPU 253. In other embodiments, the delivery can result from the controller 255 polling the GPU 253 for rendered graphical data. Once the rendered graphical data has been communicated to the controller 255, the rendered graphical data may optionally be operated upon by any one or more of the resources of controller 255. For example, the rendered graphical data may be compressed for delivery by graphics data compressor 401.

At step 511, the rendered graphical data may be packetized according to the parameters of graphical packet template, resulting in generated graphics packets. For example, controller 255 may create one or more packets according to the information describing the formation and structure of packets that is included in the template. Subsequently, the controller 255 may insert or otherwise include the rendered graphical data in the one or more packets.

In some embodiments, the controller 255 may perform additional processing on the rendered graphical data. For example, the controller 255 may perform optical character recognition (OCR) and/or small frame change detection on the rendered graphical data. The rendered graphical data may be compressed by a software image compression algorithm such as 2DRLE. The rendered graphical data may be routed toward graphical data compressor 401 (e.g., a deep compression ASIC) for compression. In some embodiments particular portions of the rendered graphical data may be compressed by the software image compression algorithm, while a remaining portion may be compressed by the graphical data compressor 401.

The graphical data compressor 401 may be configured to compress data (e.g., incoming frame buffer data for compression, or other rendered graphical data) in various ways including various compression techniques designed for video (e.g., VC1, H.264, or H.265). In some embodiments, the graphical data compressor 401 may compress data and store the compressed data (and any needed internal state data) to an output buffer. When new data arrives at the graphical data compressor 401 to be compressed, the data in the output buffer may be replaced and/or discarded, and the compressed new data (and any new internal state data) may be stored to the output buffer for delivery upon request to a processor (e.g., processor 413). An advantage to such embodiments may be that compressed data may be ready for delivery to a requesting processor.

In other embodiments, the graphical data compressor 401 may store incoming data to an incoming buffer. When new data is received by graphical data compressor 401, the data in the incoming buffer may be overwritten or replaced by the new data. The graphical data compressor 401 may proceed with compressing the data currently stored in the incoming buffer when a processor (e.g., processor 413) requests compressed data. Upon receiving the request, the graphical data compressor 401 may compress the data currently stored in the incoming buffer and send the resulting compressed data to the requesting processor. An advantage to such embodiments may be the reduced complexity of the hardware design of the graphical data compressor 401 (e.g., because the graphical data compressor 401 may not have to consider and switch between multiple internal states).

If the data portion is non-graphical data, then at step 513 the non-graphical data may be forwarded to controller 255. Forwarding can take various forms. For example, the non-graphical data may be retrieved by controller 255 or communicated by primary computing device 202 to controller 255. In some embodiments, the retrieval can occur as a result of a signal sent to the controller 255 by the resources of the primary computing device 202 that data is available for retrieval. In some embodiments, the retrieval can occur as a result of the controller 255 polling the resources for non-graphical data. The non-graphical data may already be formed into packets for transmission upon delivery to the controller 255, or may be packetized by the resources of controller 255 into one or more non-graphical packets.

At step 515, non-graphical packets and graphical packets may be merged into a single packet stream prior to transmission from the host computing device 201 to the client device 240. For example, graphics packets may be injected into an ongoing stream of non-graphical packets by controller 255 or by the operation of one or more of the resources of controller 255, such as packet injector 407. In some embodiments, injection may occur at regular intervals, where every n packets or group of packets in the stream of packets after injection is a graphical packet or group of graphical packets. In some embodiments, the injection may occur only when graphical data not yet communicated to the client device 240 is residing in the memory of controller 255.

FIG. 6 shows another method of transmitting graphical data from the host computing device 201 to the client device 240 using controller 255. FIG. 6 illustrates a method suitable for implementation in embodiments where a first and second connection between the host computing device and the client device are used. The first connection may be configured for non-graphical data, and the second connection may be configured for graphical data. In this way, it may be possible to increase the quantity of data transmitted between the host computing device and the client device. Additionally, even where the quantity of data cannot be increased because the total throughput of all connections between host computing device and client device is capped (for example, because client device 240 has a maximum communication bandwidth capacity), greater efficiencies may still be realized in the transmission of graphical data, as transmitting graphical data using a second connection may reduce the need to find appropriate locations in a data stream to insert graphical data.

At step 601, host computing device 201, or an application being executed thereupon, may operate to initiate a first connection having endpoints at host computing device 201 and at client device 240. In step 603, controller manager 453 may then operate to instruct controller 255 to listen for information regarding a second connection having endpoints at host computing device 201 and client device 240. At either or both endpoints, this second connection may be established using different physical or logical ports of a network interface. For example, the first connection may be established using logical port A of host computing device 201, and the second connection may be established using logical port B of the host computing device 201. The port configuration of the host computing device may be different from the port configuration of the client machine. For example, the first and second connection may be at different physical ports on the host computing device 201, but at different logical ports utilizing the same physical port at the client machine 240. Of course, the reverse or other port configurations are also possible.

At step 605, the second connection may be initiated by client device 240. In some instances, the host computing device 201 may operate to initiate the second connection.

At step 607, a determination may be made as to whether a portion of data to be communicated to a client machine is graphical data or non-graphical data. This step may be performed similar to step 505 of FIG. 5. Additionally, similar to the above discussion in connection with step 505 of FIG. 5, prior to step 607, it may be determined that a certain portion of data is to be communicated from the host computing device 201 to the client machine 240.

At step 609, if the data portion is non-graphical data, the non-graphical data may be communicated from host computing device to client machine 240 using the first connection described above. In some embodiments, the non-graphical data may be either retrieved by controller 255 (e.g., responsive to a signal sent to the controller that data is available for retrieval) or communicated by host primary computing device 202 to controller 255. In some variations, the non-graphical data may already be formed into packets for transmission upon delivery to the controller 255, or may be packetized by the controller 255. Alternatively, the communication can occur independent of the operation of controller 255 via direct operation of the network interfaces 221 and 223 by the resources of host primary computing device 202.

At step 611, if the data portion is graphical data, the data portion may be communicated or passed to the GPU for rendering and processing. Once the GPU 253 has completed its processing (resulting in rendered graphical data), the rendered graphical data may be communicated to the controller 255 in step 613. In some embodiments, this delivery can be performed on a scheduled basis. In other embodiments, the delivery can result from the GPU notifying the controller 255 that graphical data has been rendered and currently resides in the memory of the GPU 253. In other embodiments, the delivery can result from the controller 255 polling the GPU 253 for rendered graphical data. Once the rendered graphical data has been communicated to the controller, the rendered graphical data may optionally be operated upon by controller 255. For example, the rendered graphical data may be compressed for delivery by graphics data compressor 401. At step 615, the rendered graphical data may be packetized by the controller according to the parameters of a graphical packet template similar to the graphical packet template discussed above in connection with steps 503 and 511 of FIG. 5. One or more graphics packets may result from step 615.

At step 617, the one or more graphics packets may be communicated from the host computing device 201 to the client machine 240 using the second connection.

FIG. 7 shows another illustrative method of transmitting graphical data from the host computing device 201 to the client device 240 using controller 255. The illustrated method includes aspects related to the usage of placeholder packets in a data stream.

At step 701, data may be communicated from the host primary computing device 202 to the controller 255. At step 703, a determination may be made regarding whether a portion of the data is graphical or non-graphical data. Step 703 may be performed similar to step 505 of FIG. 5 and step 607 of FIG. 6, which are discussed above. For graphical data, steps 705, 707, and 709 may proceed similarly to steps 507, 509, and 511 of FIG. 5, respectively. Thus, at step 705, graphical data which is to be processed by the GPU is communicated to the GPU and rendered; at step 707, the rendered graphical data is communicated or returned to the controller 255; and at step 709, graphics packets are generated for the rendered graphical data received from the GPU. Of course, in some embodiments, these graphics packets conform to a template generated either by an application resource of host primary computing device 202 or by the hardware and software resources of controller 255.

At step 711, the non-graphical data may contain one or more placeholder graphical data packets. These placeholder packets may be, for example, empty or "shell" packets for eventual replacement by the graphics packets that are generated. In some variations, these placeholder packets may be generated according to a specialized interpretable language schema and contain some data. The data included in the placeholder packets may be graphical data. Controller 255 may operate to intercept these placeholder packets, for example by operation of the packet interceptor 405 based on, for example, the specialized interpretable language schema that formed the basis of the placeholder packet's structure, the graphical data included in the placeholder packets, or the placeholder packets being empty. For example, when attempting to intercept a placeholder packet, a packet may be scanned to determine whether it includes certain markers indicating that the packet is a placeholder packet. If the packet is not a placeholder packet, the packet may be forwarded onwards for transmission. On the other hand if the packet is found to be a placeholder packet, packet interceptor 405 may transmit a flag to processor 413, which in turn may send a request to graphical data compressor 401 for compressed data (e.g., to which the graphical data compressor 401 may respond with compressed data, as discussed above in connection with step 511).

Figure 8:
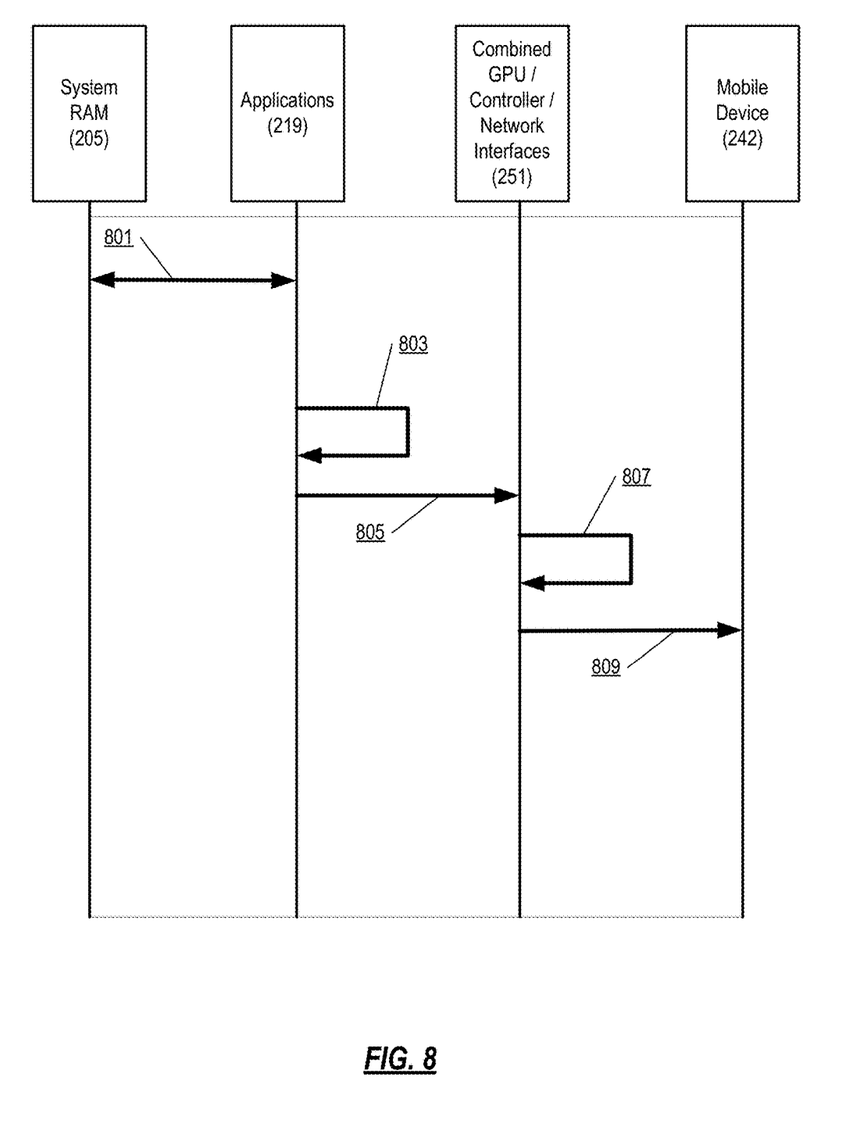
FIG. 8 depicts an illustrative data flow of graphical data through a graphical data processing and transmitting system, in accordance with one or more aspects described herein.

At step 713, the placeholder packets may be replaced prior to transmission by the graphics packets that were generated at step 709 and/or graphical data received from graphical data compressor 401 via processor 413. For example, compressed graphical data may be combined with text and small frame data. The data for inclusion in a placeholder packet may be matched together based on tagging information shared between processor 413, graphical data compressor 401 and host computing device 301. The resulting packet may be passed onto a network interface for transmission as a full graphical packet. Replacement of a placeholder packet may include interpreting the interpretable language included in the placeholder packet. As the replacement of one or more placeholder graphical data packets with graphical data packets may require processing time sufficient to de-synchronize the packets, in some embodiments, the packets may be resynchronized using the resynchronizer resource 409, resulting in a resynchronized packet stream. FIG. 8 shows an illustrative data flow path from the host computing device 201 to the client device 242, which is shown here as a mobile device. A data flow path for client device 240 would proceed similarly. Prior to point 801, the portion of data to be communicated may be retrieved or pushed into host system working memory (system RAM 205) from another memory in host computing device 201, including non-volatile memory 207 or memory 215. Of course, the portion of data to be communicated may arrive via a path that includes input/output module 209.

At point 801, one or more processors, including general processor 203, may execute instructions to manipulate the data according to the instructions stored in memory 215, including the instructions of various applications 219. As shown at point 801, the portion of data may be restored to host system memory as needed. The portion of data may remain in an application's working space for additional processing as part of one or more applications, as shown at point 803. In some variations, processing of the data at point 801 may include processing by software component 440, including VDI protocol generator 451 and controller manager 453.

At point 805, the portion of data may be retrieved or pushed from the application and/or system RAM into the host hardware component 251. Upon receipt of the data, the host hardware component may prepare the data for transmission to the client device 242. As described above, this may include a determination as to whether the data is graphical data requiring additional processing by a renderer, such as GPU 253. Thus, as shown, the portion of data may be processed at point 807 by GPU 253, controller 255, and/or network interfaces 257. In some embodiments, this processing may occur with intermediary storage of the graphical data in the controller memory 415. Of course, such processing may further include the operation of one or more resources of controller 255, such as compressor 401, packet resynchronizer 409 and packet generator 403. The details of the various processes at point 807 were discussed above in connection with the various example environments and methods.

At point 809, the rendered graphical data may be transmitted to the client device via controller 255 using any of the methods described herein. For example, packets of graphical data (e.g., the graphics packets of FIGS. 5-7) may be injected into a non-graphical packet stream, may replace placeholder packets in the data stream, or be transmitted using a second connection while non-graphical packets are sent via a separate first connection.

As can be seen above, the above process allows for graphical data that requires additional processing by a renderer to be transmitted over a network without providing the data to a system memory, such as system RAM, after it has been processed by the renderer. As illustrated, the graphical data, after it has been rendered and packetized by the combined GPU/controller/network interfaces, may be transmitted over the network directly from the combined GPU/controller/network interfaces.

Although the subject matter has been described in language specific to structural features and/or methodological acts, it is to be understood that the subject matter defined in any claim is not necessarily limited to the specific features or acts described above. Rather, the specific features and acts described above are described as example implementations of the following claims.

The invention claimed is:

1. A method comprising:
    storing, by a first processor of a host device, in a system memory of the host device, data associated with a hosted desktop environment;
    retrieving, by the first processor, from the system memory, the data;
    determining, by the first processor, that a first portion of the data comprises graphical data;
    based on determining that the data comprises graphical data, delivering the graphical data to a graphical processing unit for processing;
    processing, by the graphical processing unit, the graphical data, resulting in processed graphical data;
    based on determining, by the first processor, that a second portion of the data comprises non-graphical data, generating, by the first processor, a packet stream associated with the hosted desktop environment, wherein the packet stream comprises one or more non-graphical data packets and one or more placeholder packets; and
    without storing the processed graphical data in the system memory:
        receiving, by a second processor different from the first processor, from the first processor, the packet stream;
        receiving, by the second processor, from the graphical processing unit, the processed graphical data,
        based on the processed graphical data, generating, by the second processor, one or more graphical data packets,
        replacing, by the second processor, the one or more placeholder packets with the one or more graphical data packets, and
        transmitting, to a client device, the packet stream.

2. The method of claim 1, wherein generating the packet stream is performed by generating each of the one or more placeholder packets between two non-graphical packets.

3. The method of claim 1, wherein replacing the one or more placeholder packets with the one or more non-graphical packets is performed based on the second processor determining that one or more placeholder graphical data packets are present in the packet stream.

4. The method of claim 1, wherein a hardware component is in communication with the host device,
    wherein the hardware component comprises the graphical processing unit and a network interface,
    wherein delivering the graphical data to the graphical processing unit for processing is performed based on the first processor communicating the graphical data to the hardware component, and
    wherein transmitting the one or more graphical data packets to the client device is performed using the network interface.

5. The method of claim 4, wherein the hardware component comprises the second processor.

6. The method of claim 1, further comprising:
    without storing the processed graphical data in the system memory:
        based on determining that the packet stream includes a first placeholder packet, transmitting, by the second processor, to the graphical processing unit, a request for graphical data associated with the hosted desktop environment.

7. The method of claim 6, wherein each of the one or more placeholder packets comprises placeholder graphical data, and wherein determining that the packet stream includes a first placeholder packet is performed based on identifying the placeholder graphical data.

8. The method of claim 1, further comprising:
    generating a graphical packet template that indicates a remote presentation protocol for the hosted desktop environment;
    wherein generating the one or more graphical data packets is performed based on the graphical packet template.

9. The method of claim 8, wherein the graphical packet template indicates a structure for the one or more graphical data packets.

10. The method of claim 1, wherein the processed graphical data comprises an image of a desktop associated with the hosted desktop environment.

11. The method of claim 1, further comprising:
    performing, by the second processor, optical character recognition on the processed graphical data.

12. The method of claim 1, wherein replacing the one or more placeholder packets with the one or more graphical data packets is performed based on tagging information that associates a first placeholder packet with a first graphical data packet.

13. An apparatus comprising:
    a graphical processing unit;
    a network interface;
    a first processor;
    a second processor; and
    one or more memory devices storing executable instructions that, when executed, cause the apparatus to:
        store, by the first processor, in a system memory, data associated with a hosted desktop environment;
        retrieve, by the first processor, from the system memory, the data;
        determining, by the first processor, that the data comprises graphical data;
        based on determining that the data comprises graphical data, deliver the graphical data to the graphical processing unit for processing;
        process, by the graphical processing unit, the graphical data, resulting in processed graphical data;

based on determining, by the first processor, that a second portion of the data comprises non-graphical data, generate, by the first processor, a packet stream associated with the hosted desktop environment, wherein the packet stream comprises one or more non-graphical data packets and one or more placeholder packets; and without storing the processed graphical data in the system memory:
- receive, by a second processor different from the first processor, from the first processor, the packet stream,
- receive, by the second processor, from the graphical processing unit, the processed graphical data,
- based on the processed graphical data, generate, by the second processor, one or more graphical data packets, and
- transmit, using the network interface, to a client device, the packet stream.

14. The apparatus of claim 13, wherein the graphical processing unit is physically located on a computer hardware component and the second processor is physically located on the computer hardware component.

15. The apparatus of claim 13, wherein the graphical processing unit is physically located on a computer hardware component and the network interface is physically located on the computer hardware component.

16. The apparatus of claim 13, wherein the second processor is physically located on a computer hardware component and the network interface is physically located on the computer hardware component.

17. The apparatus of claim 13, wherein causing the apparatus to generate the packet stream is performed by generating each of the one or more placeholder packets between two non-graphical packets.

18. One or more non-transitory computer readable media storing executable instructions that, when executed, cause an apparatus to:
- store, by a first processor of the apparatus, in a system memory of the apparatus, data associated with a hosted desktop environment;
- retrieve, by the first processor, from the system memory, the data;
- determine, by the first processor, that the data comprises graphical data;
- based on determining that the data comprises graphical data, deliver the graphical data to a graphical processing unit for processing;
- process, by the graphical processing unit, the graphical data, resulting in processed graphical data;
- based on determining, by the first processor, that a second portion of the data comprises non-graphical data, generate, by the first processor, a packet stream associated with the hosted desktop environment, wherein the packet stream comprises one or more non-graphical data packets and one or more placeholder packets; and
- without storing the processed graphical data in the system memory:
  - receive, by a second processor different from the first processor, from the first processor, the packet stream,
  - receive, by the second processor, from the graphical processing unit, the processed graphical data,
  - generate, by the second processor, one or more graphical data packets based on the processed graphical data,
  - replace, by the second processor, the one or more placeholder packets with the one or more graphical data packets, and
  - transmit, to a client device, the packet stream.

19. The one or more non-transitory computer readable media of claim 18, wherein the executable instructions, when executed, cause an apparatus to:
- without storing the processed graphical data in the system memory:
  - based on determining that the packet stream includes a first placeholder packet, transmit, by the second processor, to the graphical processing unit, a request for graphical data associated with the hosted desktop environment.

20. The one or more non-transitory computer readable media of claim 18, wherein the executable instructions, when executed, cause an apparatus to:
- generate a graphical packet template that indicates a remote presentation protocol for the hosted desktop environment;
- wherein causing the apparatus to generate the one or more graphical data packets is performed based on the graphical packet template.

* * * * *